(12) United States Patent
Cooley et al.

(10) Patent No.: US 7,946,768 B2
(45) Date of Patent: May 24, 2011

(54) BEARING APPARATUSES, SYSTEMS INCLUDING SAME, AND RELATED METHODS

(75) Inventors: Craig H. Cooley, Saratoga Springs, UT (US); Aaron J. Dick, Houston, TX (US)

(73) Assignees: US Synthetic Corporation, Orem, UT (US); Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/722,289

(22) Filed: Mar. 11, 2010

(65) Prior Publication Data

US 2010/0226759 A1 Sep. 9, 2010

Related U.S. Application Data

(63) Continuation of application No. 11/212,232, filed on Aug. 26, 2005, now Pat. No. 7,703,982.

(51) Int. Cl.
- F16C 27/02 (2006.01)
- F16C 33/02 (2006.01)
- F16C 17/10 (2006.01)
- E21B 7/00 (2006.01)

(52) U.S. Cl. .......................... 384/95; 384/215; 175/320

(58) Field of Classification Search .................. 384/224, 384/303, 308, 95, 282, 283, 284, 285, 293, 384/215, 312, 309, 558, 219–223; 175/320
See application file for complete search history.

(56) References Cited

U.S. PATENT DOCUMENTS

| | | | |
|---|---|---|---|
| 3,132,908 A | 5/1964 | Grotzinger |
| 3,311,431 A | 3/1967 | Hilliard |
| 3,371,970 A | 3/1968 | Beerli |
| 3,542,441 A | 11/1970 | Nixon |
| 3,625,327 A | 12/1971 | Birdsey |
| 3,745,623 A | 7/1973 | Wentorf, Jr. et al. |
| 3,858,668 A | 1/1975 | Bell |
| 3,858,669 A | 1/1975 | Jeter |
| 4,129,343 A | 12/1978 | Janssen |
| 4,226,485 A | 10/1980 | Pruvot |

(Continued)

FOREIGN PATENT DOCUMENTS

DE 4226986 A1 2/1994

(Continued)

OTHER PUBLICATIONS

U.S. Appl. No. 12/761,535, filed Apr. 16, 2010, Scott et al.

(Continued)

*Primary Examiner* — Burton Mullins
(74) *Attorney, Agent, or Firm* — Holland & Hart, LLP

(57) ABSTRACT

A bearing apparatus is disclosed. Such a bearing apparatus may comprise a rotor including at least one bearing element mounted to the rotor and a stator including at least one bearing element mounted to the stator. At least one compliant member may be positioned between at least one selected bearing element of the at least one bearing element mounted to the rotor and the at least one bearing element mounted to the stator. Mechanical systems including such a bearing apparatus are disclosed, such as, for example, a motor for use in subterranean drilling. A method of assembling a bearing apparatus is disclosed. More specifically, a rotor and a stator each including at least one bearing element may be provided and a compressive force may be applied to the rotor and the stator to compress the bearing surfaces of the rotor and the stator against one another. Rotors and stators are disclosed.

22 Claims, 16 Drawing Sheets

U.S. PATENT DOCUMENTS

| | | | | |
|---|---|---|---|---|
| 4,240,683 | A | 12/1980 | Crase | |
| 4,256,190 | A | 3/1981 | Bodine | |
| 4,268,094 | A | 5/1981 | Greene | |
| 4,345,798 | A | 8/1982 | Cortes | |
| 4,386,666 | A | 6/1983 | Crase et al. | |
| 4,410,054 | A | 10/1983 | Nagel et al. | |
| 4,468,138 | A | 8/1984 | Nagel | |
| 4,506,998 | A | 3/1985 | Showalter | |
| 4,515,486 | A * | 5/1985 | Ide | 384/117 |
| 4,560,014 | A | 12/1985 | Geczy | |
| 4,604,106 | A | 8/1986 | Hall et al. | |
| 4,620,601 | A | 11/1986 | Nagel | |
| 4,629,373 | A | 12/1986 | Hall | |
| 4,639,146 | A * | 1/1987 | Yoshioka et al. | 384/99 |
| 4,639,416 | A | 1/1987 | Yoshioka et al. | |
| 4,657,090 | A | 4/1987 | Geczy | |
| 4,662,348 | A | 5/1987 | Hall et al. | |
| 4,708,496 | A | 11/1987 | McPherson | |
| 4,710,036 | A | 12/1987 | Geczy | |
| 4,720,199 | A | 1/1988 | Geczy et al. | |
| 4,729,440 | A | 3/1988 | Hall | |
| 4,732,364 | A | 3/1988 | Seger et al. | |
| 4,738,322 | A | 4/1988 | Hall et al. | |
| 4,756,631 | A | 7/1988 | Jones | |
| 4,764,036 | A | 8/1988 | McPherson | |
| 4,802,539 | A | 2/1989 | Hall et al. | |
| 4,818,124 | A | 4/1989 | Brandenstein et al. | |
| 4,997,292 | A | 3/1991 | Klimkovsky et al. | |
| 5,092,687 | A | 3/1992 | Hall | |
| 5,125,754 | A | 6/1992 | Ide | |
| 5,253,939 | A | 10/1993 | Hall | |
| 5,364,192 | A | 11/1994 | Damm et al. | |
| 5,368,398 | A | 11/1994 | Damm et al. | |
| 5,441,347 | A | 8/1995 | Ide | |
| 5,480,233 | A | 1/1996 | Cunningham | |
| 5,498,081 | A | 3/1996 | Dennis et al. | |
| 5,735,668 | A | 4/1998 | Klein | |
| 5,743,654 | A | 4/1998 | Ide et al. | |
| 5,795,077 | A | 8/1998 | Gozdawa | |
| 5,876,125 | A * | 3/1999 | Wyndorps et al. | 384/306 |
| 6,000,851 | A | 12/1999 | Cohen et al. | |
| 6,091,175 | A | 7/2000 | Kinsinger | |
| 6,422,754 | B1 * | 7/2002 | Dong et al. | 384/122 |
| 6,424,066 | B1 | 7/2002 | Watson et al. | |
| 6,517,246 | B2 | 2/2003 | Blackley | |
| 6,793,681 | B1 | 9/2004 | Pope et al. | |
| 7,060,641 | B2 | 6/2006 | Qian et al. | |
| 7,163,368 | B2 | 1/2007 | Ide et al. | |
| 7,306,059 | B2 | 12/2007 | Ide | |
| 7,608,333 | B2 | 10/2009 | Eyre | |
| 7,703,982 | B2 | 4/2010 | Cooley | |
| 2004/0241021 | A1 | 12/2004 | Ide et al. | |
| 2006/0278439 | A1 | 12/2006 | Ide | |
| 2007/0046120 | A1 | 3/2007 | Cooley et al. | |
| 2007/0110561 | A1 | 5/2007 | Ide et al. | |
| 2008/0115976 | A1 | 5/2008 | Ide | |

FOREIGN PATENT DOCUMENTS

| | | |
|---|---|---|
| EP | 0543461 A2 | 5/1993 |
| WO | 80/01939 | 9/1980 |

OTHER PUBLICATIONS

U.S. Appl. No. 11/879,867, filed Jul. 18, 2007, Sexton et al.

\* cited by examiner

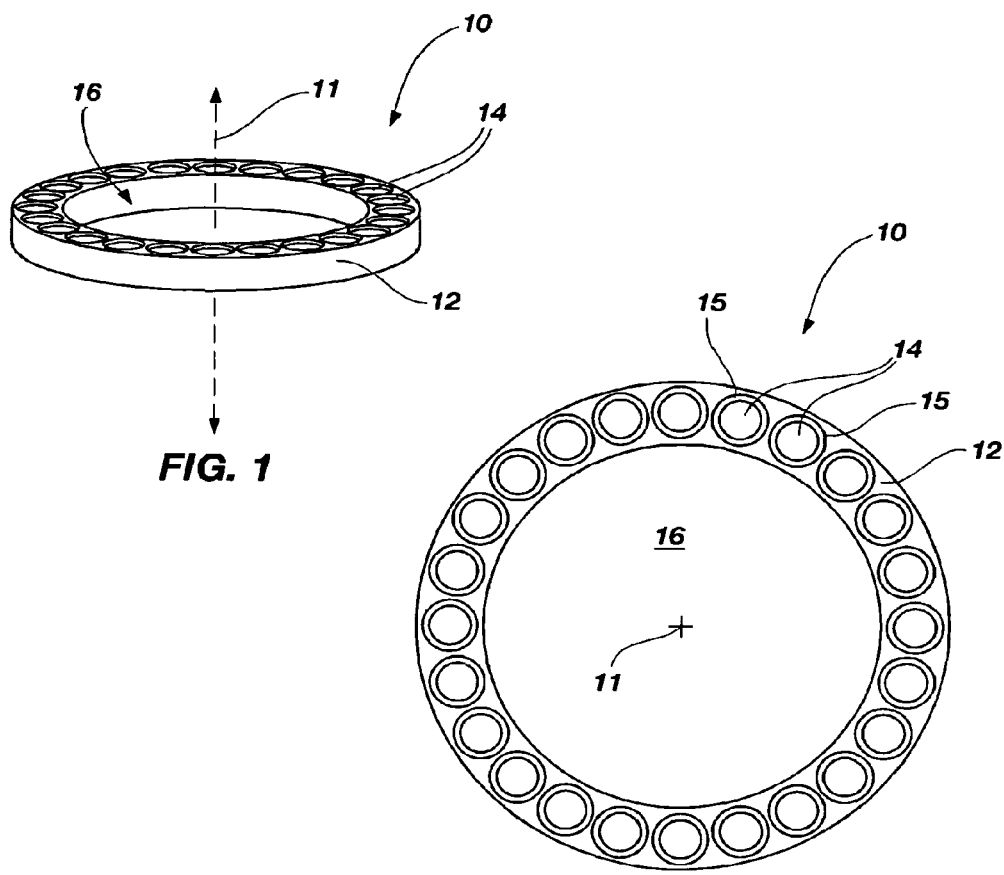
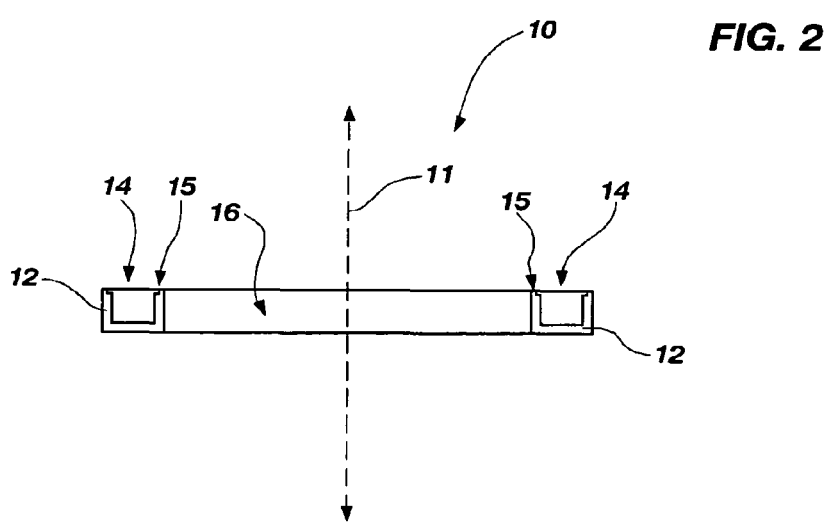
FIG. 1
FIG. 2
FIG. 3

//<br>
BEARING APPARATUSES, SYSTEMS INCLUDING SAME, AND RELATED METHODS

CROSS-REFERENCE TO RELATED APPLICATIONS

This application is a continuation of, and claims the benefit of, U.S. patent application Ser. No. 11/212,232, filed Aug. 26, 2005, entitled BEARING APPARATUSES, SYSTEMS INCLUDING SAME, AND RELATED METHODS, the disclosure of which is incorporated by reference herein in its entirety.

BACKGROUND

Conventional bearing apparatuses including bearing surfaces that move relative to one another are known in the art. For example, conventional, so-called "thrust bearings" and some embodiments of radial bearings include bearing surfaces that at least partially contact and move or slide relative to one another. Such bearing surfaces may include a superhard material for resisting wear during use of the bearing. In one example, diamond (e.g., polycrystalline diamond) may comprise at least one or both of the bearing surfaces.

More particularly, one application for thrust bearings is drilling equipment utilized in the subterranean drilling arts. Particularly, drilling motors have been utilized for drilling boreholes into a subterranean formation, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, which is commonly called drilling mud, is circulated through the pipe string and the motor to generate torque within the motor for causing the rotary drill bit to rotate. Then, the drilling fluid is returned to the surface through the annular space between the drilled borehole and the drill string and may carry the cuttings of the subterranean formation to the surface. Further, as known in the art, downhole drilling motors may include thrust bearings. More particularly, conventional downhole drilling motors include a stator that does not rotate and is connected to a housing of the motor and a rotor that rotates with the output shaft of the downhole fluid motor. In one embodiment, the stator and the rotor are each provided with a plurality of hard bearing surfaces such as diamond elements. The stator and rotor are positioned adjacent one another so that the diamond bearing surfaces of the rotor and stator contact one another. As may be appreciated, proper alignment of the diamond surfaces of the rotor and the stator may be an important factor influencing the performance and life of such a thrust bearing structure. Examples of conventional diamond thrust bearings are disclosed by U.S. Pat. Nos. 4,410,054, 4,468,138, and 5,092,687.

Thus, it would be advantageous to provide improved bearing apparatuses and systems including same.

SUMMARY

The present invention relates generally to bearing apparatuses including contacting bearing surfaces comprising superhard materials. In one embodiment, the present invention relates to bearings including polycrystalline diamond inserts or compacts defining a plurality of surfaces that move relative to one another and contact one another. Such bearing apparatuses may encompass so-called thrust bearings, radial bearings, or other bearings including bearing surfaces that more in relation to one another, without limitation.

One aspect of the instant disclosure relates to a bearing apparatus. Particularly, a bearing apparatus may comprise a rotor including at least one bearing element mounted to the rotor and a stator including at least one bearing element mounted to the stator. The at least one bearing element of the rotor may define a bearing surface and the at least one bearing element of the stator may define another bearing surface. Further, at least one compliant member may be positioned between at least one selected bearing element of the at least one bearing element mounted to the rotor and the at least one bearing element mounted to the stator. The at least one compliant member may be configured to allow for a selected magnitude of variation in the orientation of a bearing surface of the at least one selected bearing element. Various mechanical systems may include such a bearing apparatus. In one embodiment, a motor configured to apply a torque to a rotary drill bit may be operably coupled to a bearing apparatus configured as a thrust bearing apparatus.

Another aspect of the present invention relates to a method of assembling a bearing apparatus. More specifically, a rotor including at least one bearing element mounted to the rotor may be provided. Also, a stator including at least one bearing element mounted to the stator may be provided. A compressive force may be applied to the rotor and the stator to compress the bearing surfaces of the rotor and the stator against one another.

A further aspect of the present invention relates to a stator for use in a bearing apparatus. Such a stator may comprise a body including a plurality of bearing elements mounted to the body. Also, a plurality of compliant members may be positioned between the plurality of bearing elements and the body of the stator, respectively. Similarly, a yet additional aspect of the present invention relates to a rotor for use in a bearing apparatus. Such a rotor may comprise a body including a plurality of bearing elements mounted to the body. Also, a plurality of compliant members may be positioned between the plurality of bearing elements and the body of the rotor, respectively.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein:

FIG. 1 shows a perspective view of a stator according to the present invention;

FIG. 2 shows a top elevation view of the stator shown in FIG. 1;

FIG. 3 shows a side cross-sectional view of the stator shown in FIGS. 1 and 2;

DETAILED DESCRIPTION

Figure 4:
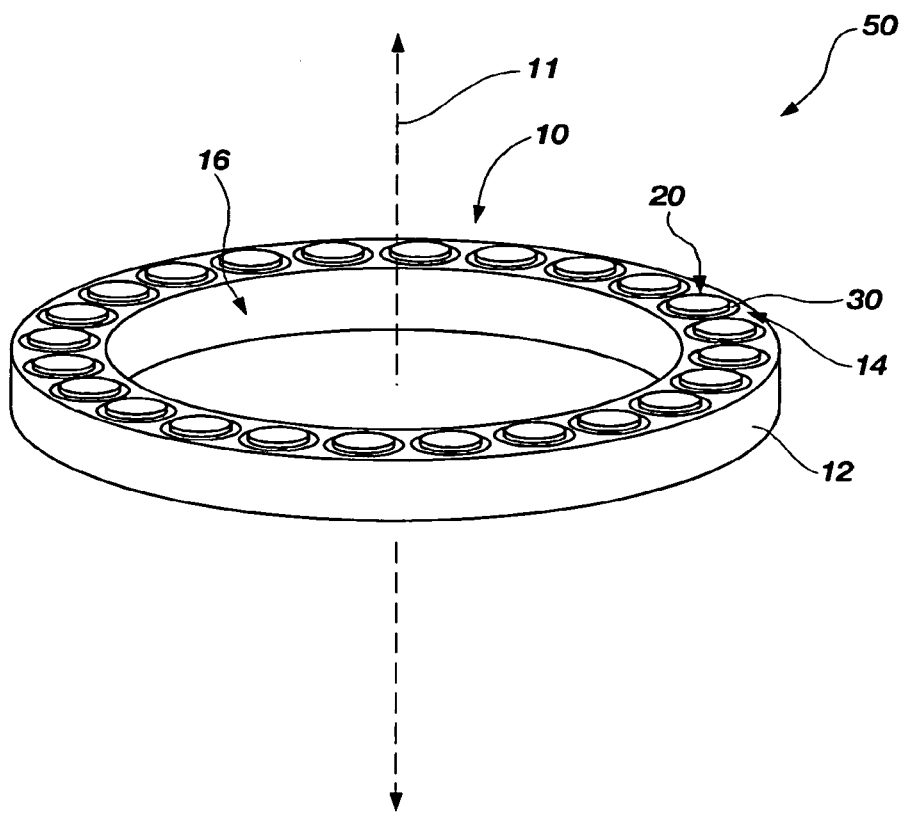
FIG. 4 shows a perspective view of a stator assembly including a stator as shown in FIGS. 1-3 and a plurality of bearing elements coupled to the stator.

The present invention relates generally to bearing apparatuses including bearing surfaces comprising superhard materials. "Superhard," as used herein, refers to any material having a hardness that is at least equal to a hardness of tungsten carbide. In one embodiment, a bearing apparatus may include polycrystalline diamond inserts or compacts defining a plurality of surfaces that move relative to one another. Such bearing apparatuses may encompass so-called thrust bearings, radial bearings, or other bearing apparatuses including bearing surfaces that move in relation to one another, without limitation. More particularly, the present invention relates to a structure for supporting at least one bearing element that is configured to allow a selected magnitude of variation in the orientation, position, or both the orientation and position of a bearing element surface of the bearing element. Such a configuration may provide a bearing element that is mounted to allow for variation in the orientation, position, or orientation and position of the bearing surface of the bearing element. Such variation may be referred to as "compliance" or "compliant," which, as used herein, means the ability of the mounting structure of a bearing element to elastically deform or otherwise allow or accommodate variations in orientation and/or position when a force is applied to the bearing surface of the bearing element.

One aspect of the present invention relates generally to bearing apparatuses including a rotor and a stator wherein the rotor includes a plurality of bearing elements defining a bearing surface and the stator includes a plurality of bearing elements defining another bearing surface. Such bearing elements may comprise a superhard material, such as, for example, polycrystalline diamond. According to one aspect of the present invention, a compliant member may be positioned between at least one bearing element of the bearing apparatus. Such a compliant member may allow for variation in the orientation, position, or position and orientation of at least one of the bearing elements of the bearing apparatus. In addition, such a configuration may promote continued contact between the bearing surface of the rotor and the bearing surface of the stator. In addition, as described in greater detail below, such a compliant member may provide compressive contact between the bearing surface of the stator and the bearing surface of the rotor notwithstanding variations in the orientation, position, or both orientation and position of the bearing elements.

In one embodiment contemplated by the present invention, a stator may include at least one bearing element wherein a compliant member is positioned between the at least one bearing element mounted to the stator. For example, FIG. 1 shows a perspective view of stator 10 comprising body 12, which defines a plurality of recesses 14 each configured for accepting a bearing element positioned generally therein. As shown in FIG. 1, body 12 of stator 10 may be configured in a generally ring-shaped or toroid-shaped configuration and may define an aperture 16 which is generally centered about longitudinal axis 11.

As shown in FIG. 2, which shows a top elevation view of stator 10, body 12 of stator 10 may form a substantially cylindrical toroid-shaped geometry and, accordingly, aperture 16 may be substantially cylindrical. Further, recesses 15 may each be positioned at substantially the same radius (i.e., upon a common bolt circle) and may be substantially equally circumferentially spaced with respect to one another in relation to longitudinal axis 11. In addition, FIG. 2 shows that each of recesses 14 may include a counterbore feature 15. A counterbore feature 15 may embody, generally, any recess or depression that enlarges an opening of a recesses 14. Explaining further, counterbore feature 15 may comprise a relatively shallow recess having a larger cross-sectional size than a cross-sectional size of the recess 14 with which it is aligned.

As shown in FIG. 2, counterbore feature 15 may be a substantially cylindrical depression which is substantially centered with respect to recess 14. FIG. 3 shows a side cross-sectional view of stator 10 taken through two recesses 14. As shown in FIG. 3, recesses 14 may extend at least partially through body 12 of stator 10. Also, FIG. 3 shows that counterbore features 15 may form a ledge or lip within each of recesses 14. Counterbore features 15 and corresponding ledges within recesses 14 may facilitate mounting of bearing elements within recesses 14.

Generally, one aspect of the present invention relates to positioning a compliant member between a bearing element mounted to either a rotor or a stator of a bearing apparatus. Thus, a compliant member may be positioned between a bearing element and a stator 10 as shown in FIGS. 1-3. For example, FIG. 4 shows a perspective view of stator assembly 50 including a plurality of bearing elements 20, wherein each bearing element 20 is positioned within a respective recess 14 of the plurality of recesses 14 formed in the body 12 of stator 10. More particularly, a compliant member 30 may be positioned between each of bearing elements 20 and each of recesses 14, respectively. Body 12 may be configured for supporting each of bearing elements 20 and may comprise a relatively rigid material having a relatively high yield strength and modulus of elasticity. For example, body 12 of stator 10 may comprise a high strength steel (e.g., 4140 AISI steel, or other high strength steel as known in the art).

Figure 5:
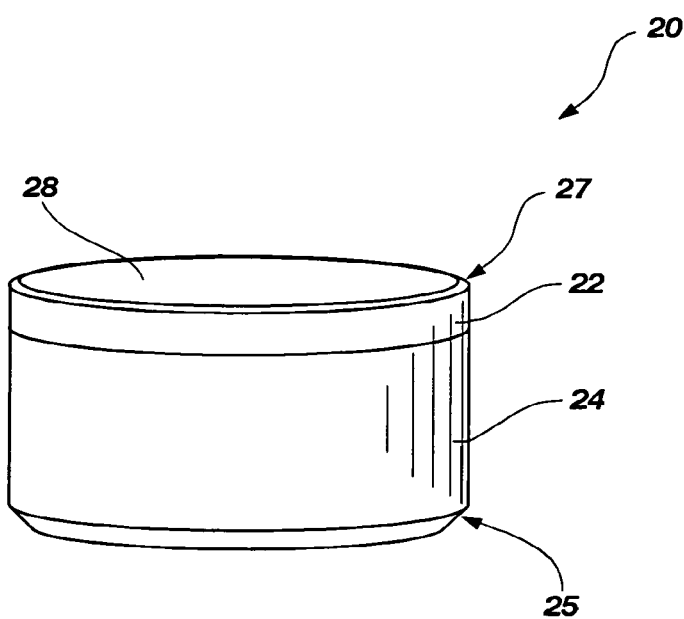
FIG. 5 shows a perspective view of a bearing element including a table bonded to a substrate.

FIG. 5 shows a perspective view of bearing element 20 including a table 22 bonded to a substrate 24. Table 22, as known in the art, may comprise a superhard material (e.g., polycrystalline diamond, cubic boron nitride, silicon carbide, or any other superhard material as known in the art). Such a configuration may provide a bearing surface 28 that is relatively wear resistant. Furthermore, table 22 includes a bearing surface 28 and may optionally include a chamfer 27. Bearing surface 28 may be substantially planar and may be configured to contact another bearing element (e.g., a bearing element coupled to a rotor) including another bearing surface that corresponds to bearing surface 28. In one embodiment, bearing element 20 may comprise a polycrystalline diamond compact ("PDC"), as known in the art. In such a configuration, substrate 24 may comprise a cobalt sintered tungsten carbide and table 22 may comprise polycrystalline diamond. As known in the art, polycrystalline diamond may include a catalyst (e.g., cobalt, nickel, iron, or any other catalyst as known in the art) to facilitate formation of polycrystalline diamond. Optionally, at least a portion of a catalyst within table 22 may be removed (e.g., by acid leaching or as otherwise known in the art). As shown in FIG. 5, bearing element 20 may be substantially cylindrical.

Figure 6:
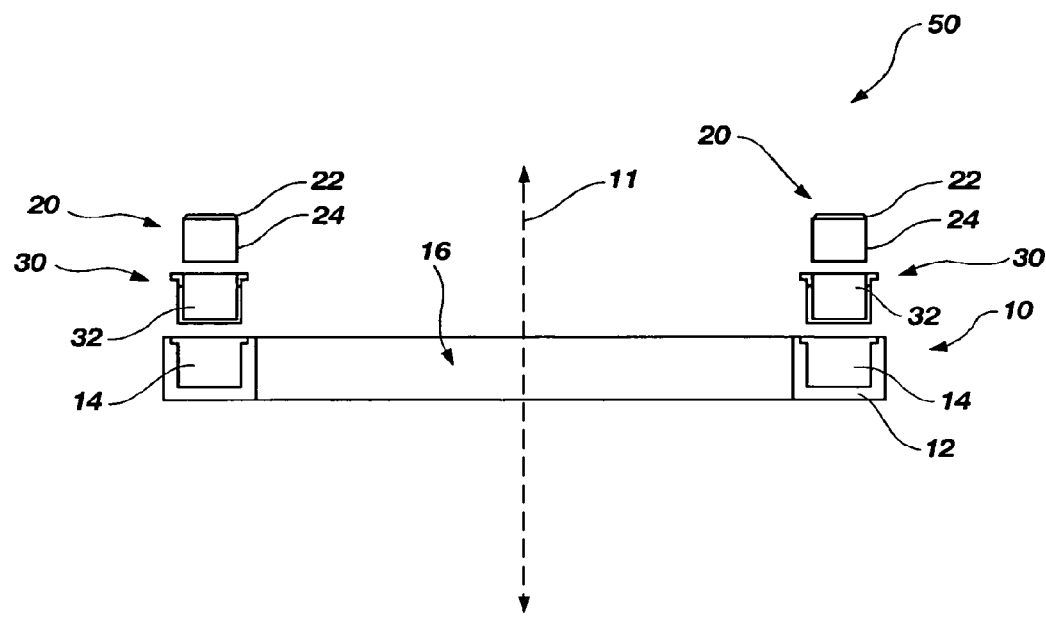
FIG. 6 shows a partial, exploded, side cross-sectional assembly view of the stator assembly shown in FIG. 4.

As shown in FIG. 6, compliant member 30 may include recess 32 configured for accepting a bearing element 20. Further, compliant member 30 may be configured to generally correspond to the shape of recess 14 formed in body 12 of stator 10. Thus, compliant member 30 may be configured to surround at least a portion of a periphery (e.g., a circumference) of bearing element 20 and may provide a desired level of compliance between such a bearing element 20 and recess 14. Accordingly, compliant member 30 may comprise a material having a relatively moderate modulus of elasticity (e.g., between about 5,000 ksi and about 30,000 ksi). For example, compliant member may comprise materials including, but not limited to, aluminum, copper, titanium, brass, or bronze. Such a configuration may allow for variation in the position, orientation, or position and orientation of bearing element 20 when it is positioned generally within a recess 14. Explaining further, a force or a moment applied to bearing element 20 may cause elastic deformation of compliant member 30.

Figure 7:
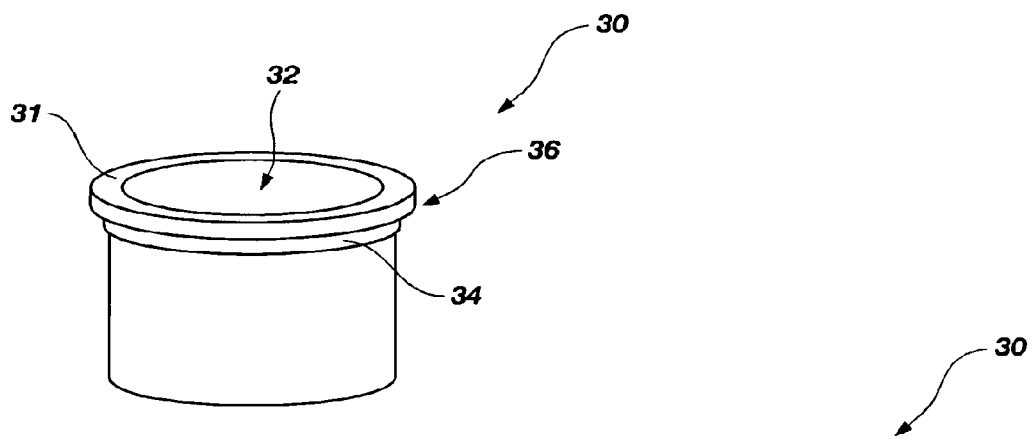
FIG. 7 shows a perspective view of one embodiment of a compliant member according to the present invention.
Figure 8:
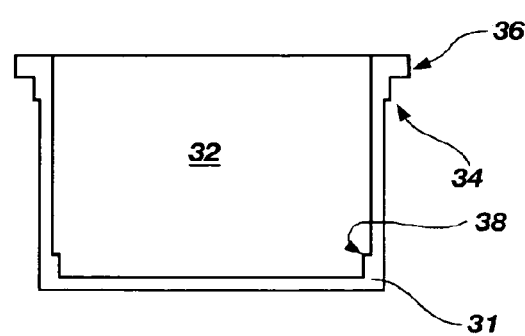
FIG. 8 shows a side cross-sectional view of the compliant member shown in FIG. 7.

FIG. 7 shows a perspective view of one embodiment of a compliant member. More particularly, FIG. 7 shows a compliant member 30 which is generally tubular and substantially cylindrical. Further, compliant member 30 defines a generally cylindrical recess 32 at its closed end. Further, FIG. 8 shows a side cross-sectional view of the compliant member 30 shown in FIG. 7. As shown in FIGS. 7 and 8, compliant member 30 includes a flange 36, an outer lip 34, and an inner lip 38. Flange 36 may be configured to fit within (i.e., with clearance between) counterbore feature 15 of recess 14 formed in stator 10. Optionally, outer lip 34 may be configured for at least partially interfering with the bore of recess 14, if desired, which may facilitate retention of compliant member 30 within recess 14. Optionally, inner lip 38 may be configured to interfere with an outer periphery of a bearing element 20. Such a configuration may facilitate retention of a bearing element 20 within a compliant member 30 positioned within a recess 14 of stator 10 or may separate a lower surface of bearing element 20 from a lower surface of compliant member 30, as discussed below. Compliant member 30 may be configured to exhibit a selected level of elastic deformation for compliance, which may allow a bearing element associated therewith to exhibit variation in its orientation and/or position.

Figure 9:
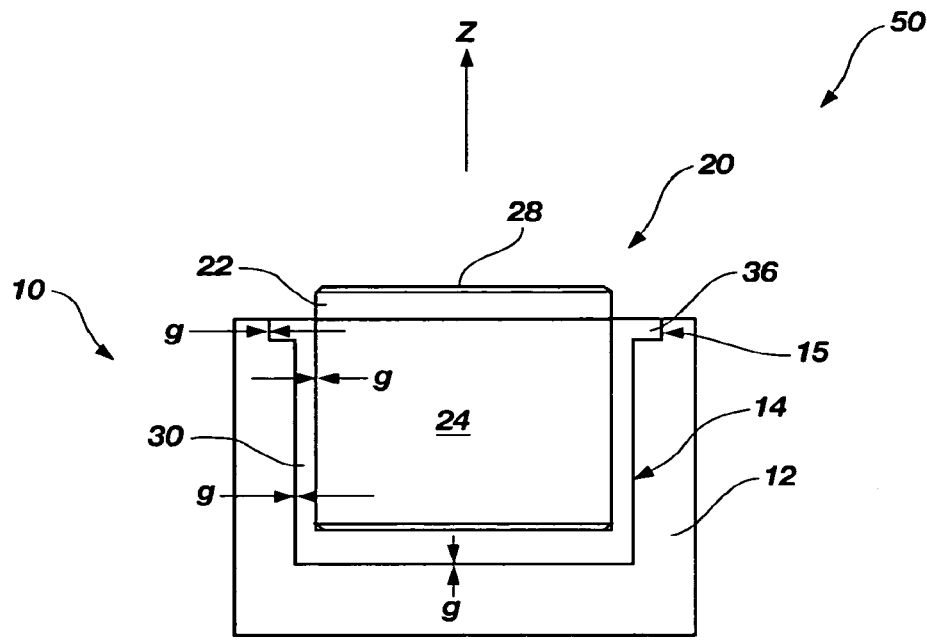
FIG. 9 shows a partial, schematic, side cross-sectional view of a bearing element and compliant member positioned generally within a recess of a stator.

FIG. 9 shows a partial, schematic, side cross-sectional view of stator 10, illustrating a bearing element 20 and a compliant member 30 positioned within recess 14. Axis Z is shown, however, the cross section of bearing element 20, compliant member 30, and recess 14 shown in FIG. 9 is generic, which means that it may embody any selected plane taken through such elements. As shown in FIG. 9, flange 36 may be positioned generally within counterbore feature 15 (outer lip 34 and inner lip 38, as shown in FIGS. 7 and 8, are omitted for clarity). It may be appreciated that compliant member 30 may fit within recess 14 of stator 10 with clearance. In addition, optionally, bearing element 20 may fit within compliant member with clearance. More particularly, as shown in FIG. 9, gaps (labeled "g") of between about 0.002 inches and 0.005 inches may exist between a peripheral side surface of the compliant member 30 and the recess 14. Further, as shown in FIG. 9, a gap (labeled "g") of between about 0.002 inches and 0.005 inches may exist between a lower surface of the compliant member 30 and a lower surface defining a portion of recess 14. As a further variation, a lower surface of bearing element 20 may be offset from a lower surface of compliant member 30 (e.g., by a gap "g"), if desired. Thus, as may be appreciated, compliant member 30, recess 14, and bearing element 20 may allow for variation in the position of bearing element 20 along a lateral direction (i.e., substantially perpendicular to longitudinal direction Z, which may be either a circumferential direction, a radial direction, or both) and along a longitudinal direction Z. In one embodiment, compliant member 30 may support bearing element 20 within recess 14, wherein recess 14 and a periphery of compliant member 30 are substantially separated. Of course, the relative size of gaps g may be adjusted to provide a selective magnitude of movement or play (and corresponding flexibility behavior or spring constant) to a bearing element 20. Thus, it may be appreciated that bearing element 20 may be displaced circumferentially (i.e., about longitudinal axis 11), radially (outwardly or inwardly with respect to longitudinal axis 11), or both, depending on the forces applied to bearing element 20. Similarly, bearing element 20 may be displaced upwardly along axis Z or downwardly along axis Z depending on the force applied to bearing element 20 in a longitudinal direction. Of course, such displacements may cause an orientation of bearing surfaces 28 of bearing elements 20 to vary.

Figure 10:
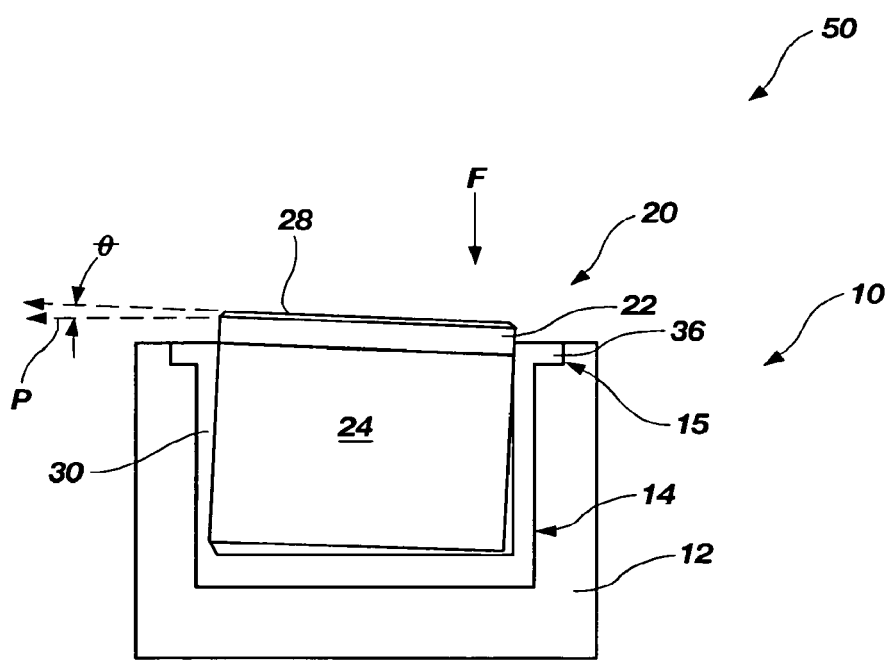
FIG. 10 shows a partial, schematic, side cross-sectional view of the bearing element and compliant member shown in FIG. 9, wherein an orientation of a bearing surface of the bearing element varies with respect to a desired orientation.

Explaining further, compliant member 30 may be configured to allow a selected level of variation in the orientation of bearing surface 28. As shown in FIG. 10, angle θ may be formed between a reference plane P and bearing surface 28. Although bearing surface 28 is depicted in FIG. 10 as being substantially planar, the present invention contemplates that bearing surface 28 may be arcuate or may be configured as otherwise known in the art. Thus, if bearing surface 28 is arcuate, angle θ may be measured between a selected position (e.g., a line) of the arcuate bearing surface and reference plane P. In one embodiment, angle θ may vary (i.e., compliant member 30 may be structured to allow angle θ to vary) within about ±2° of a desired orientation (e.g., reference plane P). More specifically, variation of angle θ within about ±1° of a desired orientation (e.g., reference plane P) may be ample for most applications. Within such orientation variation, compliant member 30 may be configured to exhibit elastic deformation. Such a configuration may allow for an orientation of bearing element 20 (e.g., bearing surface 28) to change during the operation of a bearing apparatus. The cross section shown in FIG. 10 is merely schematic and may embody any selected cross section (of the components) taken in any selected direction, without limitation. Accordingly, orientation of bearing surface 28 may vary (e.g., tip or tilt) in any direction or manner. Thus, it may be appreciated that during operation of a bearing apparatus, a force F applied to a portion of bearing element 20, as shown in FIG. 10, may cause the bearing surface 28 of bearing element 20 to change its orientation. Such a force F may be generated via contact between bearing elements coupled to a stator and rotor, as known in the art. The present invention contemplates that a compliant member positioned between at least one bearing element of either a stator or a rotor or both a stator and a rotor may be advantageous to allow for variation in an orientation, position, or orientation and position of such at least one bearing element.

Figure 11:
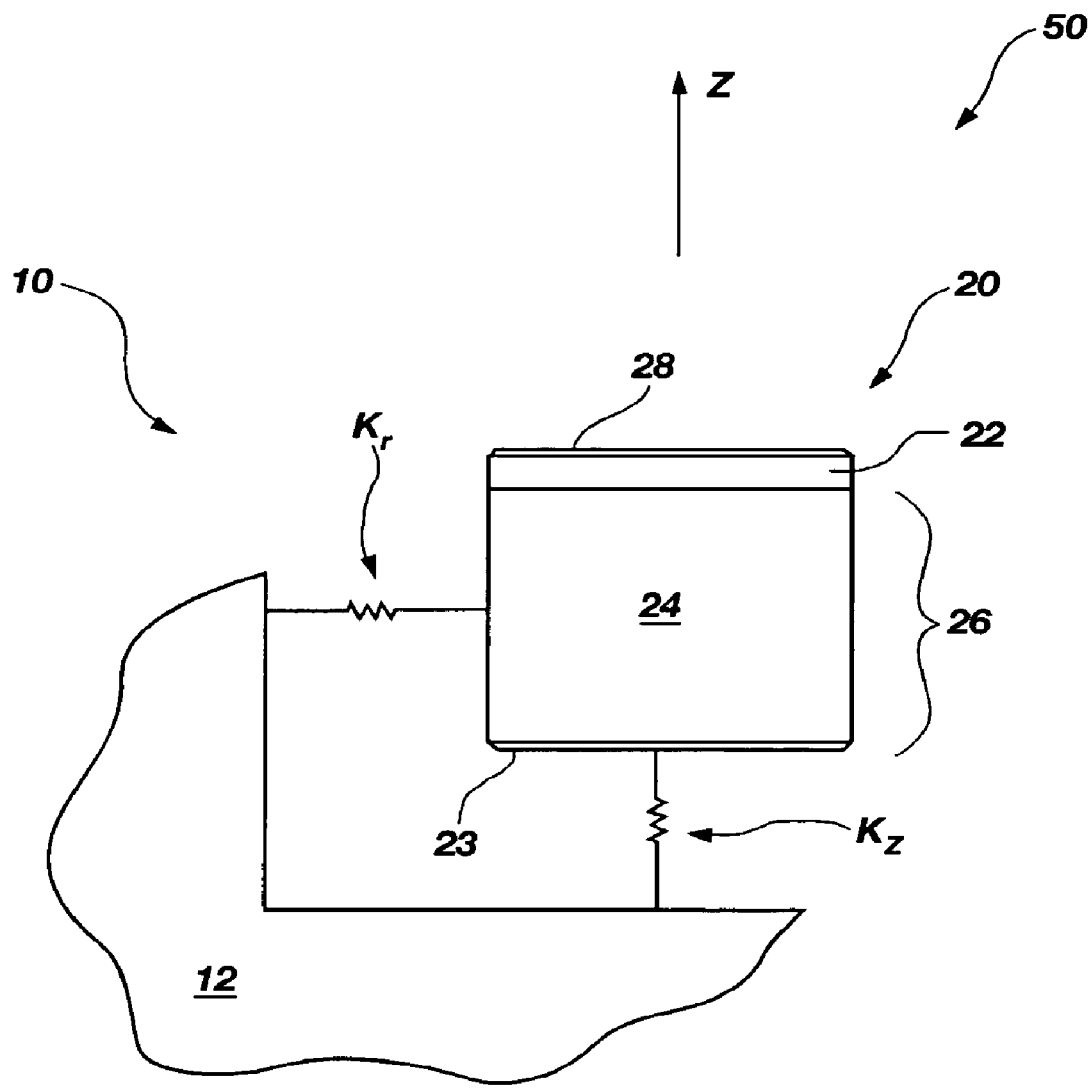
FIG. 11 shows a schematic view of a bearing element coupled to a stator by a plurality of biasing elements.
Figure 12:
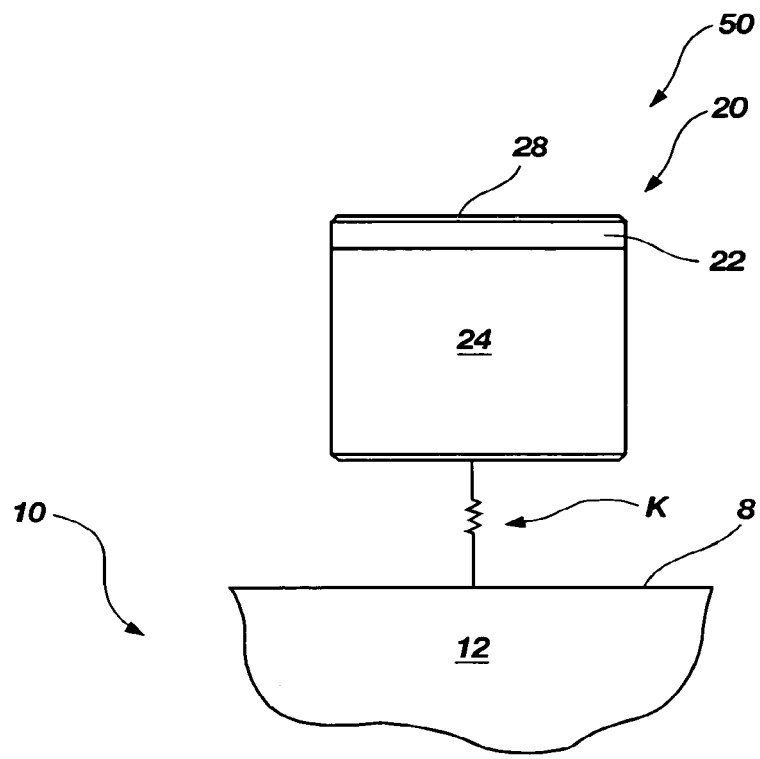
FIG. 12 shows a schematic view of a bearing element coupled to a stator by one biasing element.

More conceptually, the present invention contemplates that at least one biasing element positioned between a bearing element and a stator (or a rotor). For example, FIG. 11 shows a schematic view of a bearing element 20 coupled to the body 12 of stator 10 by biasing elements $K_r$ and $K_z$. Thus, it may be appreciated that a spring constant or stiffness may be selected for each of biasing elements $K_r$ and $K_z$ to provide a selected level of compliance in a longitudinal direction Z and a lateral direction, respectively. In one embodiment, biasing element $K_r$ and biasing element $K_z$ may function substantially independently. For example, a compliant sleeve may be positioned about at least a portion of a side periphery 26 (e.g., an outer diameter or circumference) to provide a biasing element between body 12 of stator 10 and bearing element 20. Further, a disc-shaped biasing element $K_z$ (e.g., a washer spring or other spring as known in the art) may be positioned between a lower surface 23 of bearing element 20 and a body 12 of stator 10. Thus, conceptually, radial compliance, circumferential compliance, and longitudinal compliance may be independent of one another. In other embodiments, radial compliance, circumferential compliance, and longitudinal compliance may be interdependent.

Figure 13:
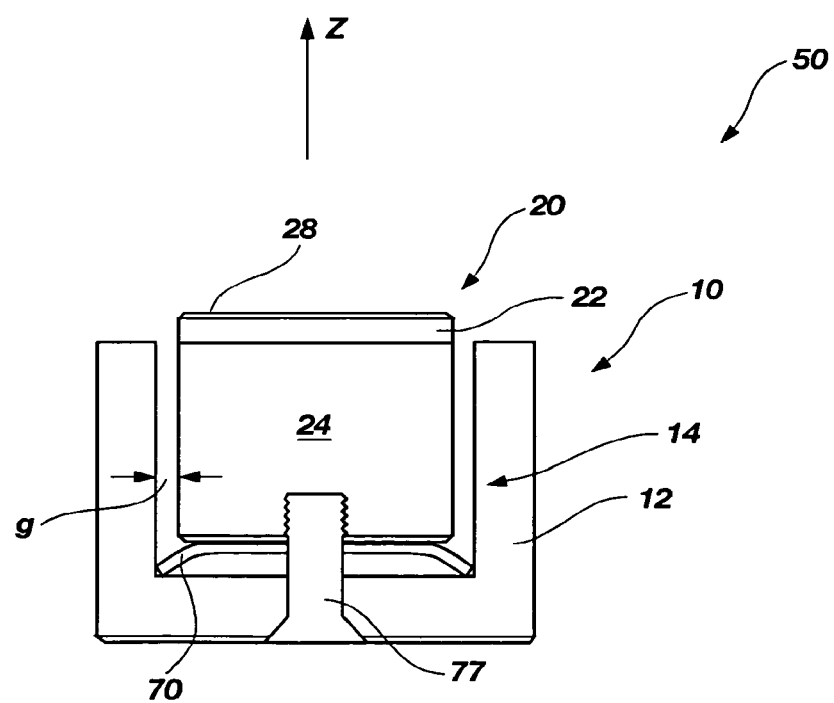
FIG. 13 shows a partial, schematic, side cross-sectional view of a bearing element coupled to a stator, wherein a washer spring is positioned between the bearing element and the stator.

In another embodiment, a biasing element K may be positioned between bearing element 20 and body 12 of stator 10. Biasing element K may be configured to provide compliance with respect to a position, an orientation, or both in at least one direction or degree of freedom. For example, biasing element K may allow for variation in an orientation of bearing surface 28 and, optionally, may allow for variation in a longitudinal position of bearing surface 28 of bearing element 20. For example, FIG. 13 shows a partial, schematic, side cross-sectional view of a stator assembly 50 including a washer spring 70 (e.g., a wave spring washer, a curved spring washer, or a Belleville spring washer) positioned between a bearing element 20 and a recess 14 formed in the body 12 of stator 10. As shown in FIG. 13, recess 14 may be larger than substrate 24 of bearing element 20. Thus, a gap "g" may be provided between a sidewall of substrate 24 and a sidewall of recess 14. Gap g may be between about 0.002 inches and 0.005 inches, without limitation. Such a configuration may allow for bearing element 20 to be displaced generally within recess 14 (e.g., radially, circumferentially, or longitudinally). Further, such configuration may allow for variation in the orientation of bearing surface 28, as discussed above with respect to FIG. 10. Optionally, a fastening element 77 (e.g., a threaded fastener or other fastener as known in the art) may couple the substrate 24 of bearing element 20 to stator 10 to prevent the bearing element from being removed from recess 14. However, such a fastening element 77 may be configured to allow for a selective range of movement (e.g., longitudinal and orientation of the bearing surface 28) of the bearing element 20 within recess 14 of stator 10 (i.e., against washer spring 70). In addition, such a configuration may allow for the bearing elements of the rotor and the stator to be compressively forced against one another, as discussed in further detail below. Also, it may be understood that such compressive force may be desirable for retaining bearing element 20 generally within recess 14 formed within the body 12 of stator 10.

Figure 14:
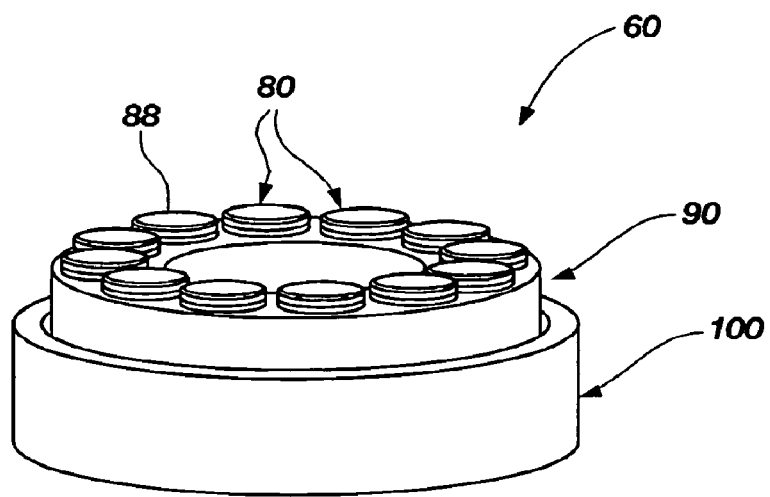
FIG. 14 shows a perspective view of a rotor assembly including a rotor and a rotor base.

FIG. 14 shows a perspective view of rotor assembly 60 including bearing elements 80, rotor 90, and rotor base 100. As known in the art, rotor 90 and rotor base may be substantially cylindrical and may be affixed to one another. As shown in FIG. 14, rotor 90 may comprise a generally ring-shaped body that may be coupled to rotor base 100. In addition, bearing elements 80 may be configured so that alignment and rotation of rotor assembly 60 with stator assembly 50 results in at least one bearing surface 28 of a bearing element 20 being in substantially constant contact with at least one respective bearing surface 88 of bearing elements 80. Put another way, upon rotation of rotor assembly 60 a bearing surface 88 of a bearing element 80 contacts a circumferentially adjacent bearing surface 28 of a bearing element 20 prior to loss of contact with a circumferentially proceeding bearing surface 28 of a bearing element 20. Of course, many embodiments relating to the arrangement of bearing elements associated with a rotor and bearing elements associated with a stator are contemplated by the present invention and any configurations as known in the art may be employed within a bearing apparatus according to the present invention.

Figure 15:
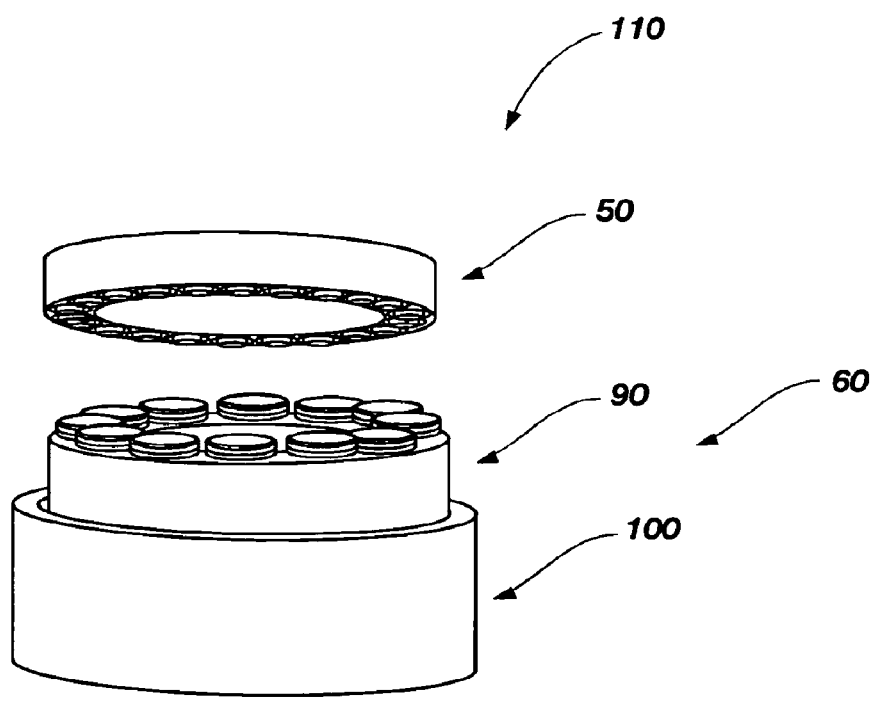
FIG. 15 shows a perspective view of a bearing apparatus according to the present invention including a stator assembly and a rotor assembly.

From the foregoing description, it may be appreciated that a rotor assembly 60 and a stator assembly 50 may be used in combination with one another to form a bearing apparatus. For example, FIG. 15 shows a perspective view of a bearing apparatus 110 including stator assembly 50 and rotor assembly 60. During use, rotor assembly 60 and stator assembly 50 may be aligned with one another and the bearing surfaces 28 of bearing elements 20 may be in contact with the bearing surfaces 88 of bearing elements 80, respectively. Of course, rotor assembly 60 and stator assembly 50 may be affixed to a system to provide a thrust bearing structure. It should also be appreciated that the terms "rotor" and "stator" refer to rotating and stationary portions of a bearing apparatus, respectively, and, therefore, "rotor" and "stator" may refer to identical components configured to rotate and remain stationary, respectively. For example, such thrust bearing structures may be employed in subterranean drilling systems, such as, for instance, mud motors or other down hole assemblies. U.S. Pat. No. 5,092,687 to Hall, the disclosure of which is incorporated herein, in its entirety, by this reference, discloses conventional thrust bearing structures and systems associated therewith. It should be appreciated that rotor 90 may include at least one compliant member positioned between at least one bearing element 80 and the body defining rotor 90. Summarizing, at least one of bearing elements 20 or bearing elements 80 may be coupled to stator 10 or rotor 90, respectively, via a compliant member. In one embodiment, as described above, each of the plurality of bearing elements 20 may be coupled to stator 10 via a respective compliant member. In another embodiment, each of bearing elements 80 may be coupled to rotor 90 by a respective compliant member.

Figure 16:
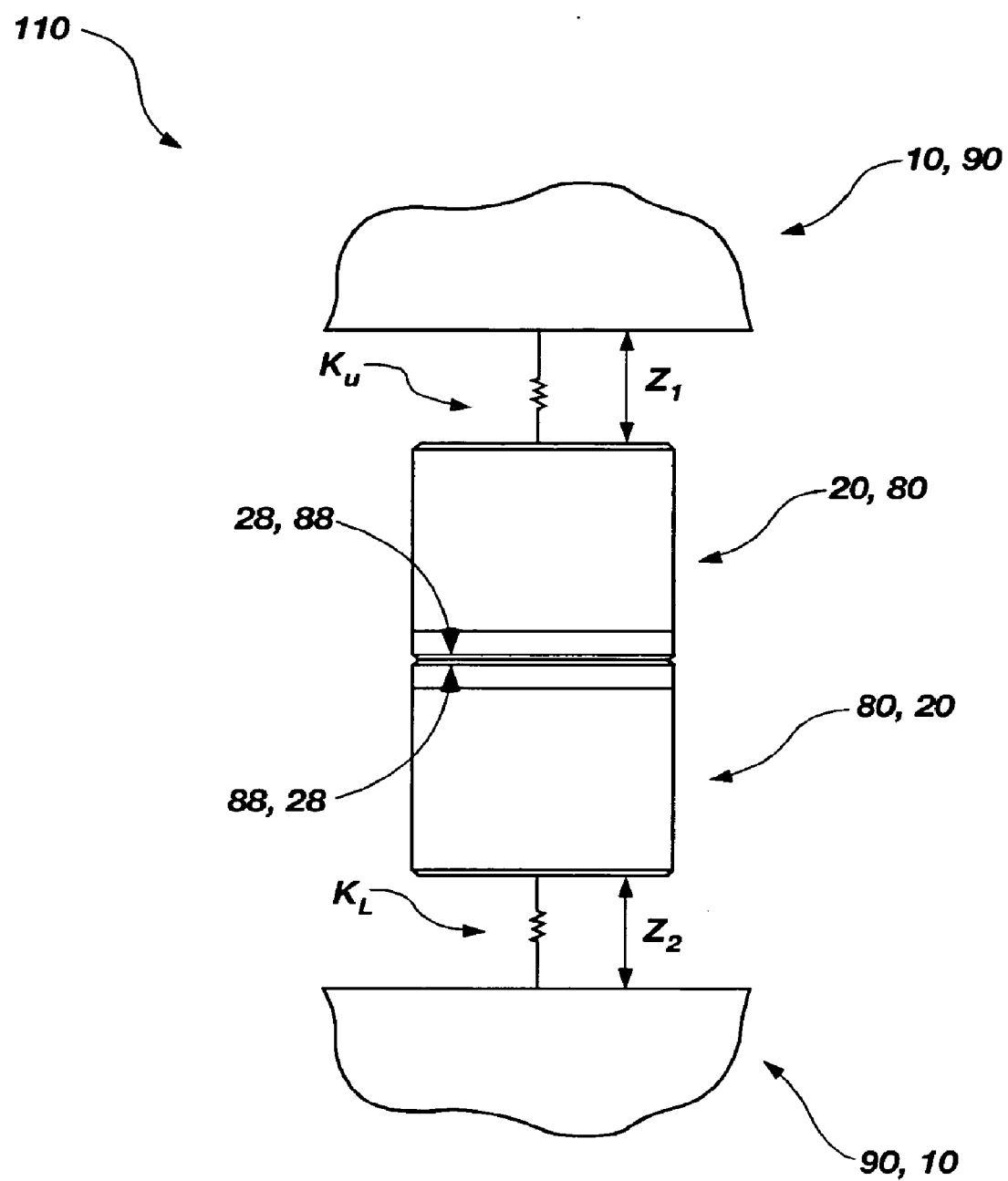
FIG. 16 shows a partial, schematic view of a bearing apparatus, wherein respective compliant members are positioned between respective bearing elements of a stator and a rotor.
Figure 17:
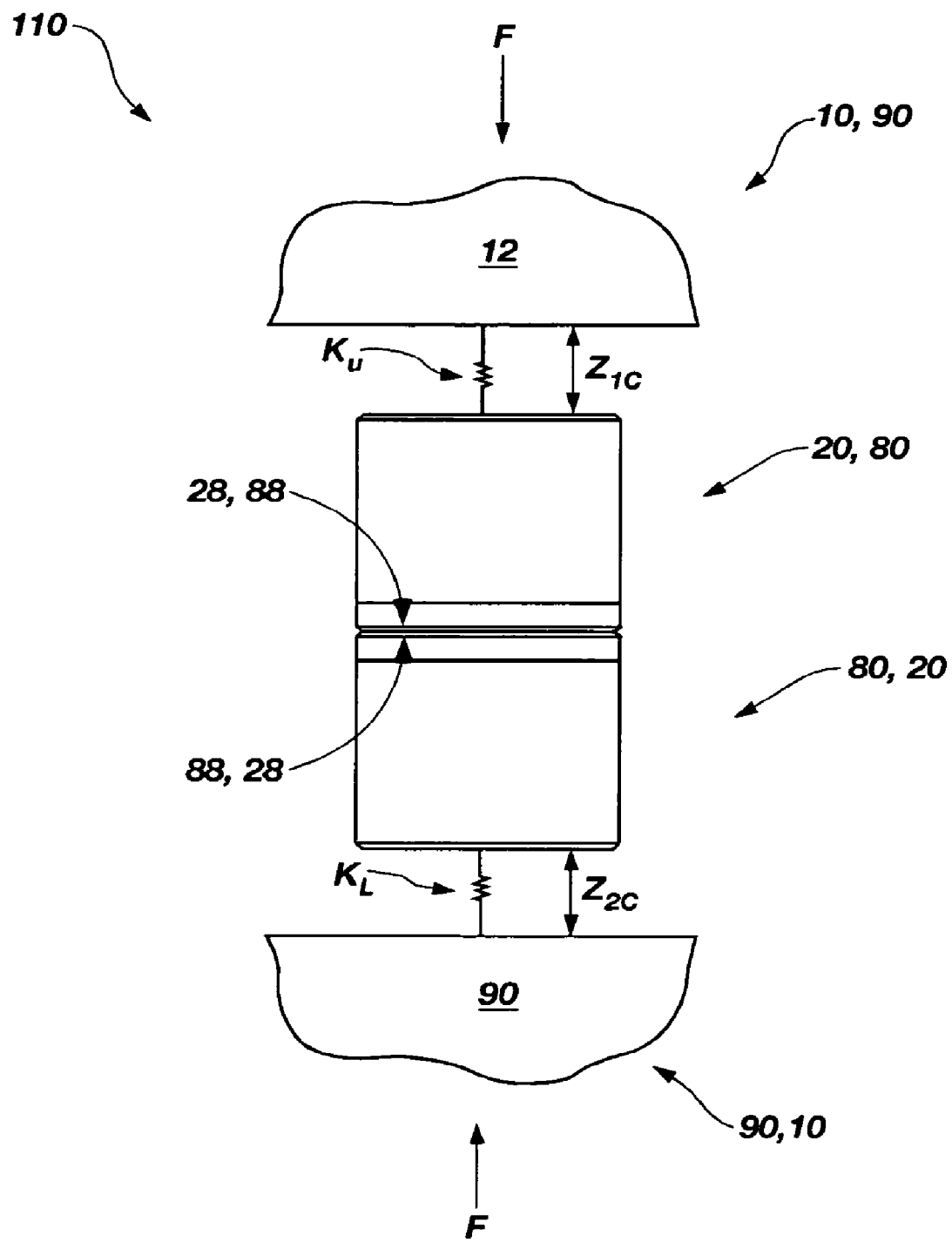
FIG. 17 shows a schematic view of the bearing apparatus shown in FIG. 16, wherein the rotor and stator are compressed toward one another.
Figure 18:
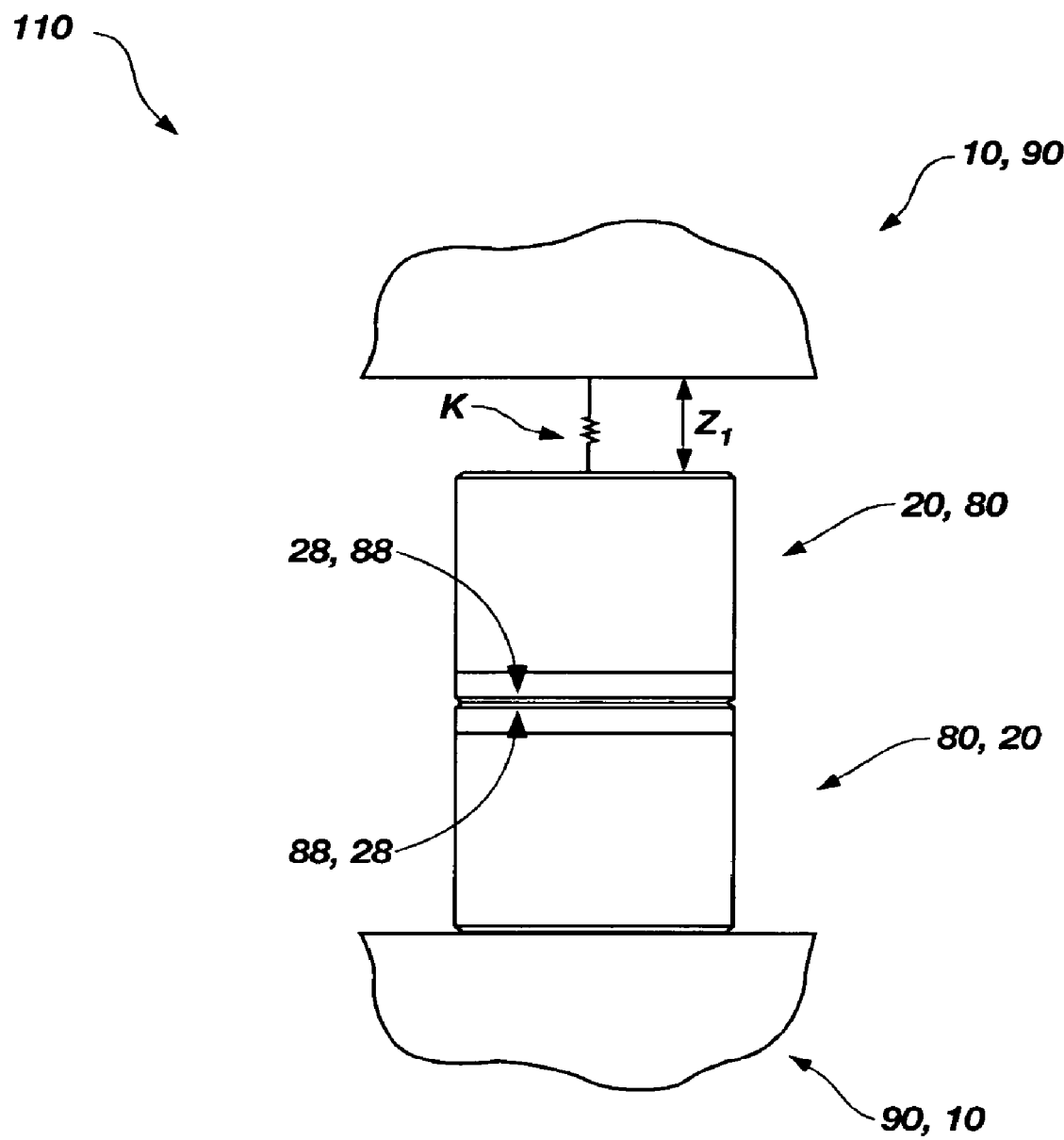
FIG. 18 shows a schematic view of a bearing apparatus, wherein a compliant member is positioned between at least one bearing element of a rotor or a stator.
Figure 19:
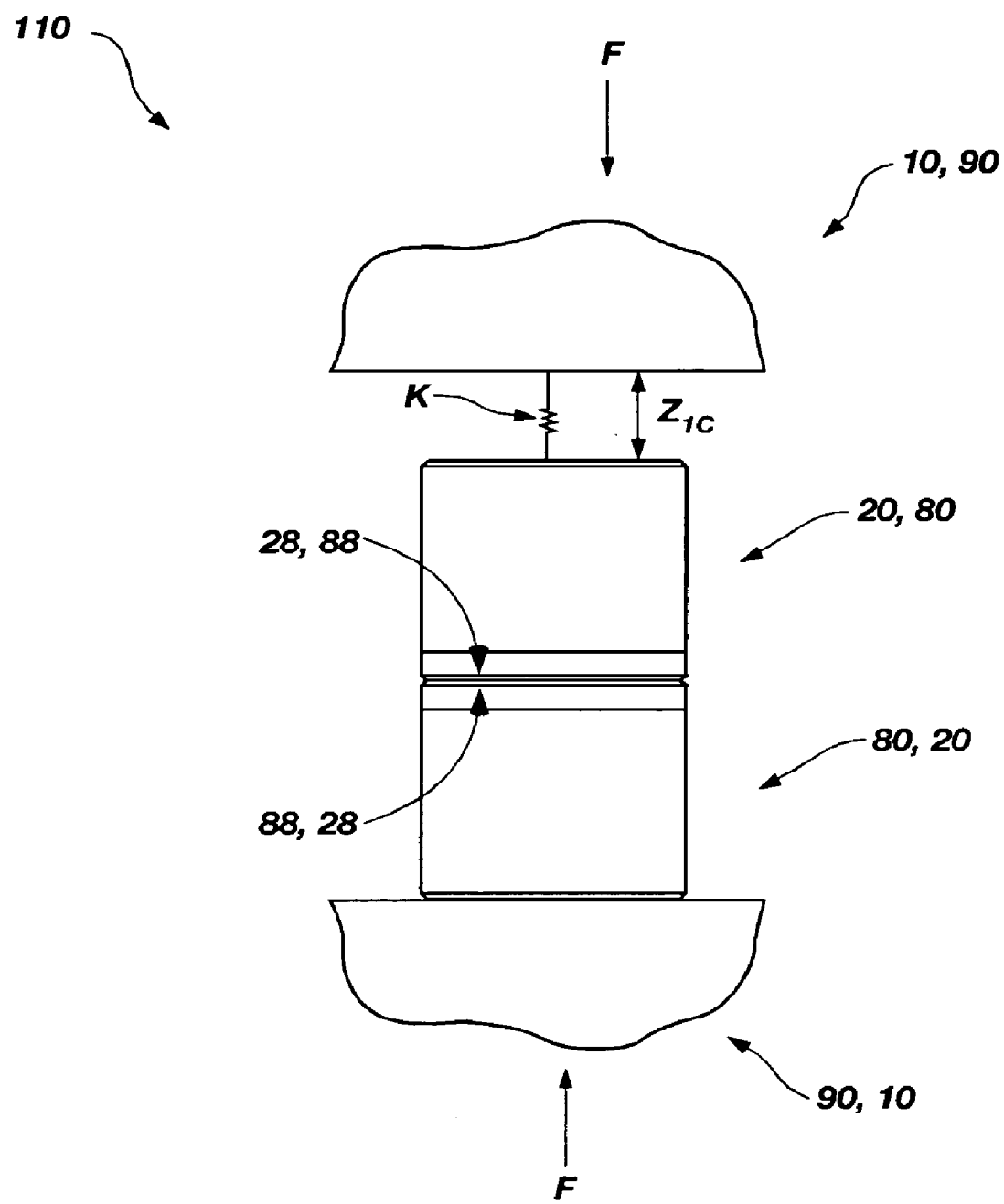
FIG. 19 shows a schematic view of the bearing apparatus shown in FIG. 18 wherein the rotor and the stator are compressed toward one another.

FIG. 16 shows a schematic view of a bearing apparatus 110 including a rotor 90 and a stator 10 wherein compliant members $K_u$ and $K_l$ are positioned between the bearing elements 20, 80 of stator 10 and rotor 90, respectively. As shown in FIG. 16, bearing surfaces 28, 88 may initially contact one another and may be positioned away from stator 10 and rotor 90 by longitudinal distances $Z_1$ and $Z_2$. Although bearing elements 20, 80 are shown as being substantially identical in FIG. 16 it should be understood that such a representation is merely illustrative and not drawn to scale. Therefore, bearing elements 20, 80 may be configured as described above or as otherwise known in the art, without limitation. FIG. 17 shows the bearing apparatus 110 as shown in FIG. 16, wherein a compressive force F is applied to stator 10 and rotor 90. As shown in FIG. 17, compressive force F may cause bearing elements 20, 80 to be positioned with respect to stator 10 and rotor 90 at respective longitudinal distances $Z_{1c}$ and $Z_{2c}$, wherein $Z_{1c}$ is less than $Z_1$ and $Z_2$ is less than $Z_2$. Accordingly, it may be appreciated that compliant members $K_u$ and $K_l$ are compressed by compressive force F. Of course, as shown in FIGS. 18 and 19, more generally, at least one compliant member K may be positioned between at least one bearing element 20, 80 of a stator 10 or rotor 90. Similar to the above-described embodiment, a compressive force F may cause bearing element 20, 80 to be positioned at respective longitudinal distances $Z_1$ and $Z_{1c}$, wherein $Z_{1c}$ is less than $Z_1$, as shown in FIGS. 18 and 19. Such a compressive force F (FIGS. 17 and 19) may be referred to as a "preload" between the rotor and stator and may be applied by a clamping device or other device as known in the art, which maintains the compressive force during relative rotation between stator 10 and rotor 90. For example, in one embodiment, a clamping device may include at least one rolling element configured to roll along a surface of at least one of stator 10 and rotor 90 while providing a compressive force therebetween.

Figure 20:
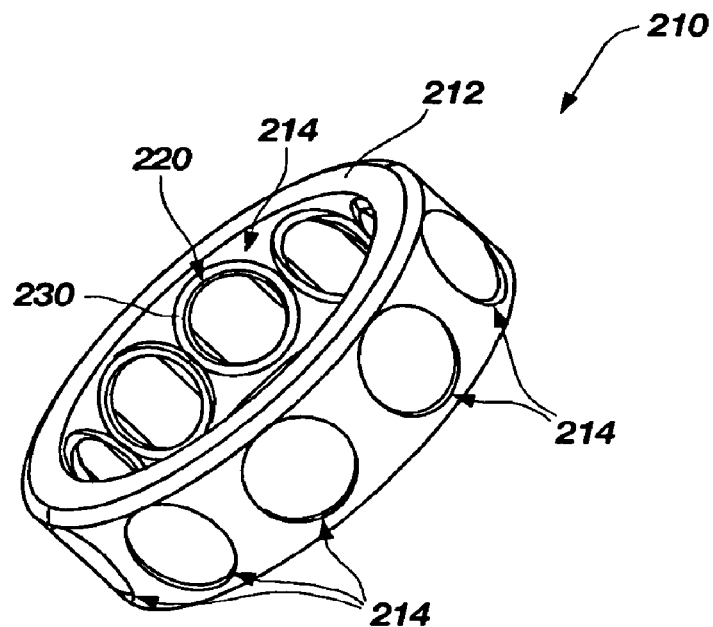
FIG. 20 shows a perspective view of an outer race including a plurality of bearing elements coupled to the outer race.
Figure 21:
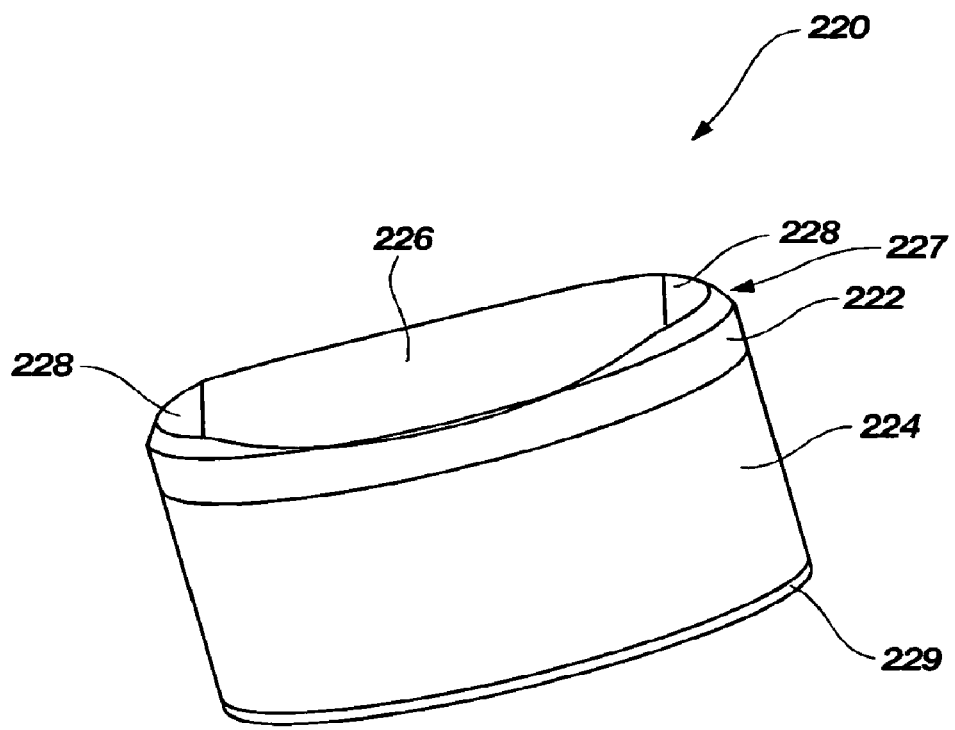
FIG. 21 shows a perspective view of the bearing element shown in FIG. 20.

The present invention further contemplates that at least one compliant member may be included within a radial bearing apparatus that includes a first plurality of bearing elements collectively defining a first bearing surface and a second plurality of bearing elements collectively defining a second bearing surface. For example, FIG. 20 shows a perspective view of an outer race 210 including a plurality of bearing elements 220. More specifically, outer race 210 may comprise a body 212 defining a plurality of recesses 214 within which bearing elements 220 may be positioned, respectively. Further, in the embodiment shown in FIG. 20, a compliant member 230 may be positioned between each of the bearing elements 220 and the recesses 214 of outer race 210. Also, FIG. 21 shows a perspective view of bearing element 220, which may be generally configured as described above with respect to bearing elements 20 and 80. Thus, bearing element 220 includes a table 222 bonded to a substrate 224 wherein table 222 defines a bearing surface 226. However, as shown in FIG. 21, bearing surface 226 may be substantially concave. In one embodiment, bearing surface 226 may comprise a portion of a substantially cylindrical surface. In addition, bearing element 220 may optionally include substantially planar surfaces 228 and a chamfer 227. Also, substrate 224 may optionally include a chamfer 229, as shown at FIG. 21.

Figure 22:
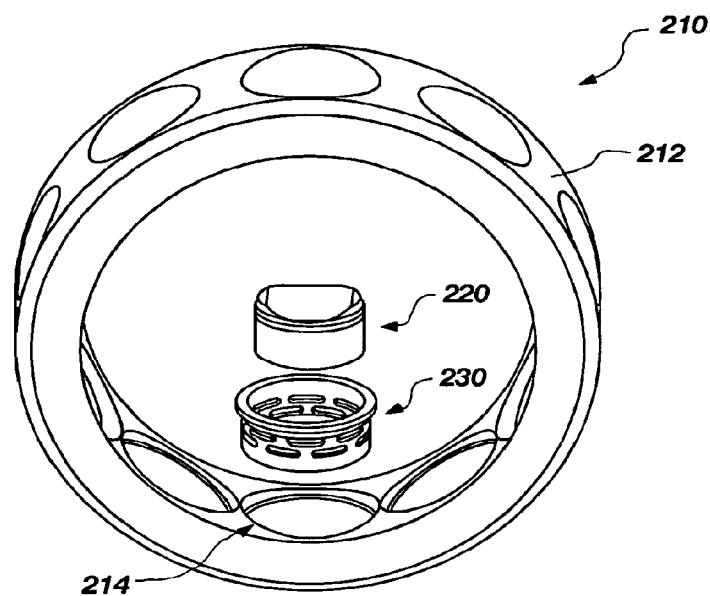
FIG. 22 shows a partial, exploded, assembly view of the outer race shown in FIG. 20.
Figure 23:
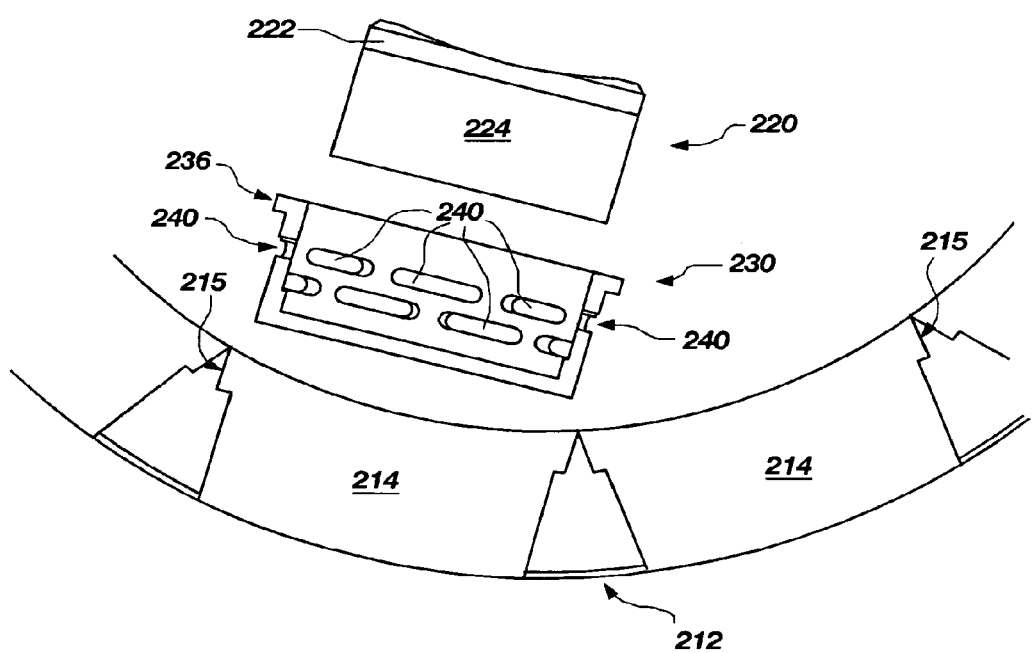
FIG. 23 shows a partial, side cross-sectional view of the outer race shown in FIG. 22.
Figure 24:
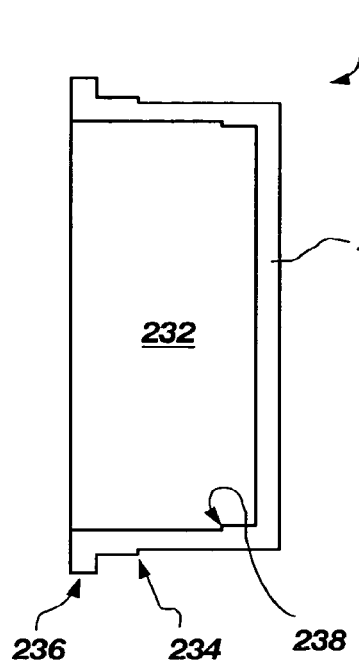
FIG. 24 shows a side cross-sectional view of a compliant member as shown in FIGS. 22 and 23.
Figure 25:
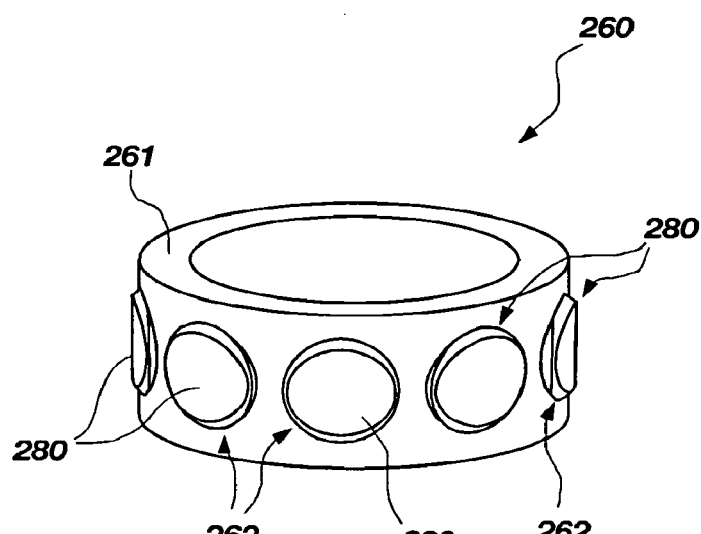
FIG. 25 shows a perspective view of an inner race including a plurality of bearing elements coupled to the inner race.

FIG. 22 shows a partial exploded assembly view of outer race 210 including one bearing element 220 and its associated compliant member 230. In further detail, FIG. 23 shows a partial, side cross-sectional view of the partial assembly of outer race 210 shown in FIG. 22. As shown in FIGS. 22 and 23, compliant member 230 may include a plurality of apertures 240 formed therethrough. Such apertures 240 may be configured to provide a selected level of compliance to a bearing element positioned therein. Apertures 240 are shown in FIGS. 24 and 25 to be circumferentially spaced about the cylindrical sidewall of compliant member 230. However, the present invention contemplates other embodiments for apertures 240. For instance, apertures 240 may be formed in a longitudinal direction about the circumference of the compliant member to form a plurality of tines or prongs extending from the bottom or closed end of the compliant member. In another embodiment, apertures 240 may be formed through the bottom or closed end of compliant member 230. Otherwise, compliant member 230 may be generally configured similarly to compliant member 30 as described above. Particularly, FIG. 24 shows a side cross-sectional view (omitting apertures 240, for clarity) including flange 236, outer lip 234, and inner lip 238 formed by body 231 of compliant member 230. Thus, summarizing, a plurality of bearing elements 230 may be coupled to the body 212 of outer race 210 so that each bearing surface 226 of the bearing elements 220 collectively form a bearing surface for a radial bearing apparatus.

Figure 26:
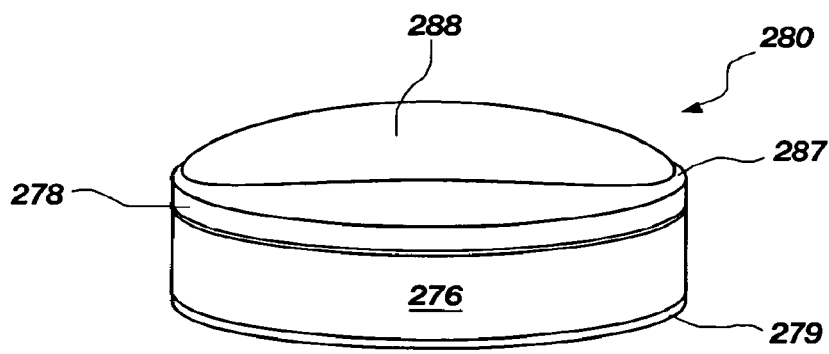
FIG. 26 shows a perspective view of the bearing element as shown in FIG. 25.
Figure 27:
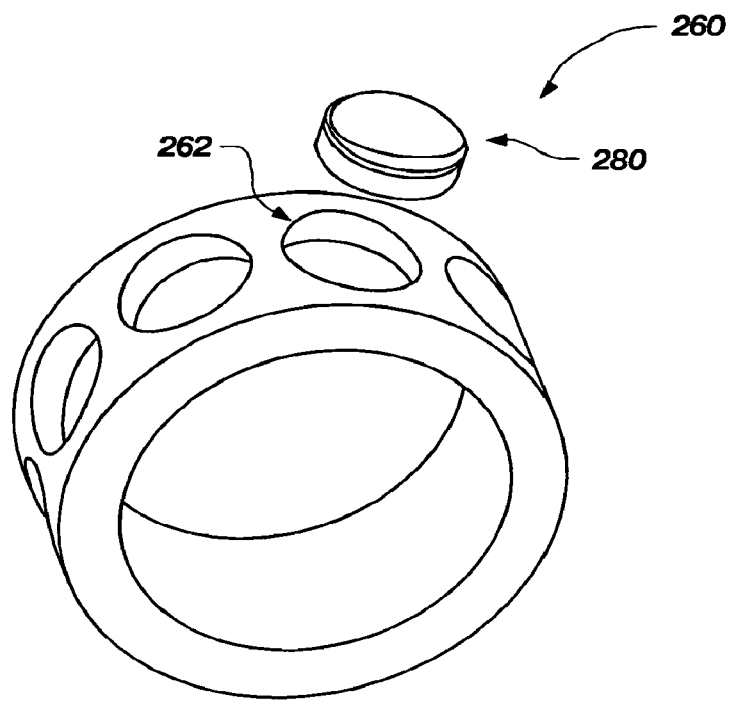
FIG. 27 shows a partial, exploded assembly view of the inner race shown in FIG. 25.
Figure 28:
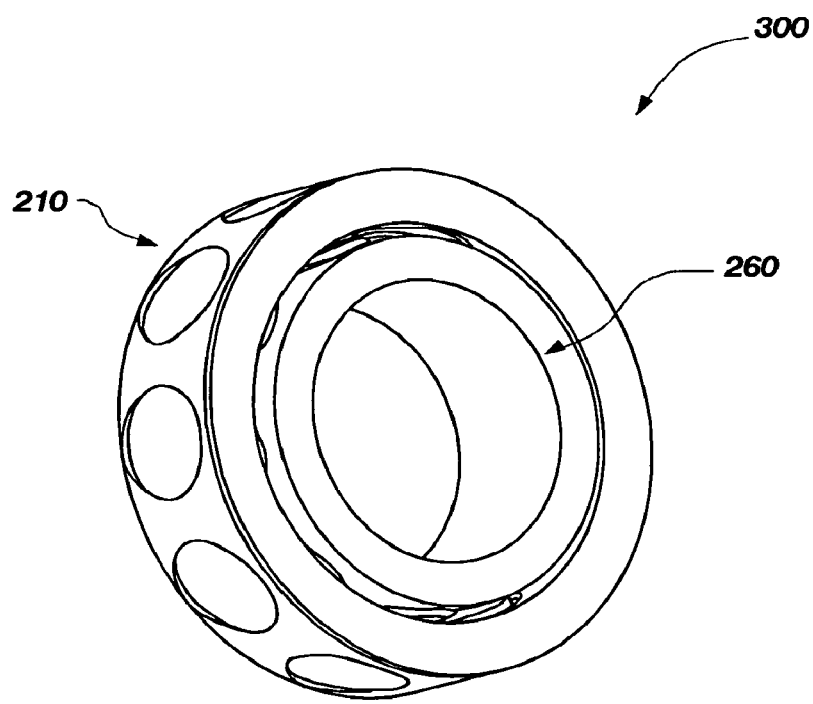
FIG. 28 shows a perspective view of a radial bearing assembly according to the present invention.

Accordingly, the present invention contemplates that an inner race may be positioned within the outer race and may include a bearing surface defined by a plurality of bearing elements wherein each of the bearing elements has its own bearing surface. For example, FIG. 25 shows a perspective view of an inner race 260 including a plurality of bearing elements 280 positioned generally within recesses 262. Generally, bearing elements 280 may each include a bearing surface configured to correspond with the bearing surface of each of bearing elements 220. More specifically, FIG. 26 shows a perspective view of bearing element 280 including a bearing surface 288 configured as a substantially convex surface. In one embodiment, bearing surface 288 may comprise a portion of a substantially cylindrical surface. Further, bearing element 280 includes a chamfer 287 formed on table 278, wherein table 278 is bonded to a substrate 276, which may include a chamber 279. Thus, it may be appreciated that bearing elements 280 may be coupled to the body 261 of inner race 260 to form an inner race assembly. In further detail, FIG. 27 shows a partial exploded, assembly view of inner race 260 including a bearing element 280 positioned proximate to its associated recess 262. Bearing element 280 may be positioned generally within recess 262 and coupled to the body 261 of inner race 260. For instance, bearing element 280 may be adhesively bonded, brazed, welded, fastened, or otherwise affixed to the body 261 of inner race 260 as known in the art. Thus, inner race 260 and outer race 210 may be configured so that the bearing surfaces (collectively defined by the plurality of bearing elements 280 and the plurality of bearing elements 220) may at least partially contact one another. FIG. 28 shows a perspective view of a radial bearing apparatus 300 including inner race 260 positioned generally within outer race 210. As explained above, at least one bearing element 220, 280 may be preloaded (i.e., against one another, respectively) during the assembly of radial bearing apparatus 300. Such a configuration may provide a radial bearing apparatus that withstands vibrations as well as variations in the relative position of inner race and outer race without sustaining damage. It should be understood (as explained above with respect to the terms "rotor" and "stator") that inner race 260 and outer race 210 may be described as a rotor and a stator, or vice versa, depending on how the inner race 260 and the outer race 210 are configured to move relative to one another. Of course, such a radial bearing apparatus may be included within a mechanical system. For instance, so-called "roller cone" rotary drill bits may benefit from a radial bearing apparatus contemplated by the present invention. More specifically, it may be appreciated that an inner race may be mounted or affixed to a spindle of a roller cone and an outer race may be affixed to an inner bore formed within a cone and that such an outer race and inner race may be assembled to form a radial bearing apparatus. Such a radial bearing apparatus may be advantageous because of its ability to withstand relatively high temperatures and its wear resistance. One embodiment of a roller cone rotary drill bit is disclosed in U.S. Pat. No. 4,738,322 to Hall, et al., the disclosure of which is incorporated herein, in its entirety, by this reference. Accordingly, it is contemplated that a radial bearing apparatus may be cooled by a drilling fluid (i.e., a drilling mud) used to carry cuttings from a leading end of a bore hole upward to the surface of a subterranean formation, as known in the art.

Figure 29:
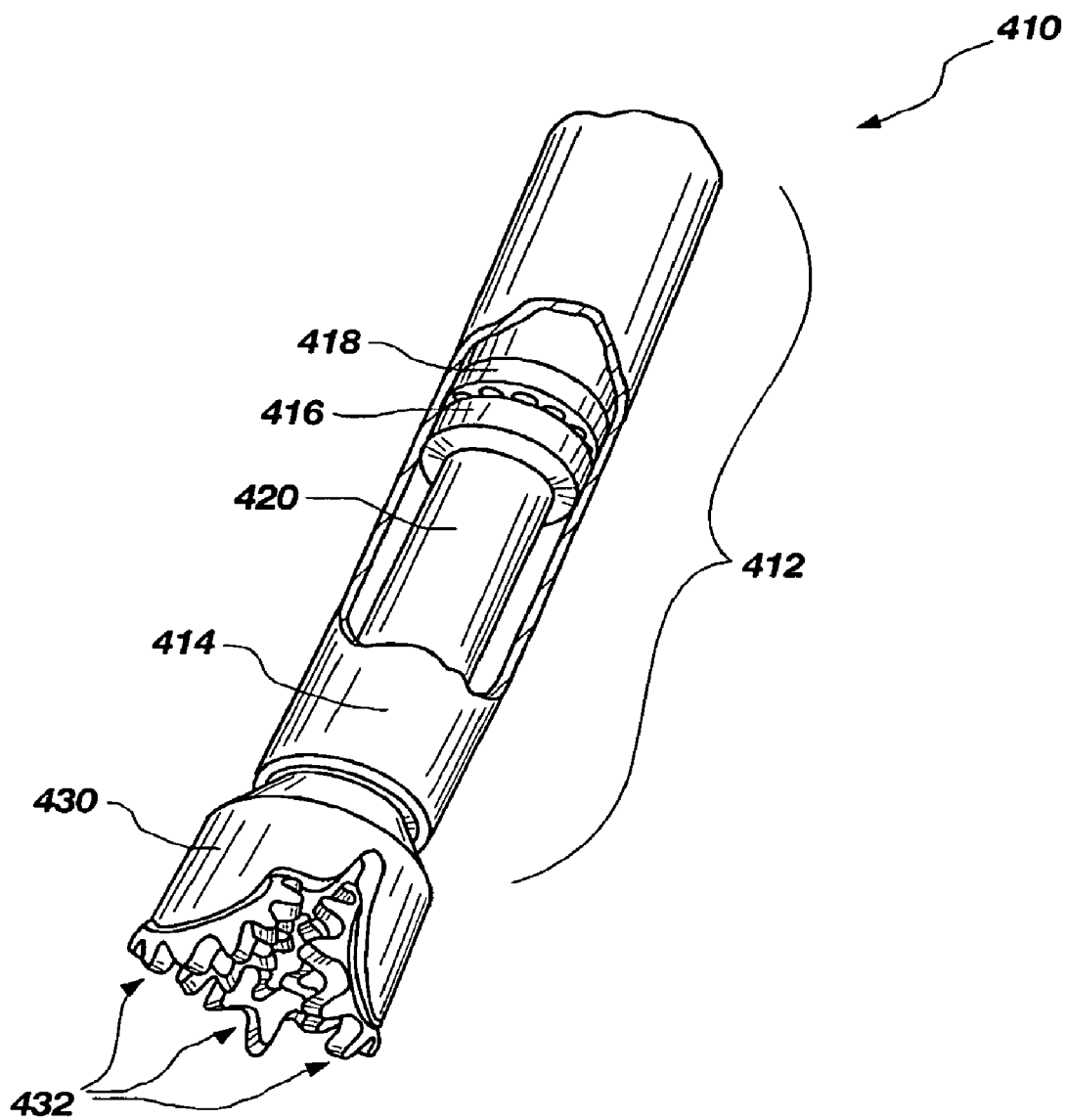
FIG. 29 shows a perspective view of a subterranean drilling system including a thrust bearing apparatus according to the present invention.

As mentioned above, the bearing apparatuses disclosed above may be incorporated into a mechanical system. For example, FIG. 29 shows a perspective view of a subterranean drilling system 410 incorporating a thrust bearing apparatus according to the present invention. In particular, as known in the art, a rotary drill bit 430 may be rotated by downhole drilling motor assembly 412. Downhole drilling motor assembly 412 may be located at the end of a series of pipe sections comprising a drill string. The housing 414 of downhole drilling motor assembly 412 remains stationary as rotary drill bit 430 rotates. In further detail, output shaft 420 of downhole drilling motor assembly 412 may be coupled to rotary drill bit 430 and drilling fluid (i.e., drilling mud) may cause torque to be applied to the output shaft 420 and to rotary drill bit 430. Rotary drill bit 430 is shown as a so-called "roller cone" type bit including roller cones 432, but may be a fixed cutter (e.g., a drill bit including polycrystalline diamond cutting elements or compacts) or any other rotary drill bit or drilling tool (e.g., a reamer, reamer wing, impregnated diamond drill bit, core bit, etc.) as known in the art, without limitation. As shown in FIG. 29, a rotor 416 and a stator 418 (i.e., a thrust bearing apparatus) may be operably assembled to downhole drilling motor assembly 412, as known in the art. U.S. Pat. Nos. 4,410,054, 4,560,014, 5,364,192, 5,368,398, and 5,480,233, the disclosure of each of which is incorporated herein, in its entirety, by this reference, disclose exemplary subterranean drilling systems within which bearing apparatuses according to the present invention may be incorporated. Although the apparatuses and systems described above have been discussed in the context of subterranean drilling equipment and applications, it should be understood that such apparatuses and systems are not limited to such use and could be used within a bearing apparatus or system for varied applications, if desired, without limitation. Thus, such apparatuses and systems are not limited to use with subterranean drilling systems and may be used with various other mechanical systems, without limitation.

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A bearing apparatus comprising:
a first structure having a plurality of bearing elements defining a first bearing surface, at least one bearing element of the plurality of bearing elements of the first structure comprising a polycrystalline diamond table formed on a substrate;
a second structure having a plurality of bearing elements defining a second bearing surface, the first bearing surface and the second bearing surface configured to engage one another during relative displacement of the first structure and the second structure;
a first compliant member positioned between the first structure and the at least one bearing element of the first structure, the first compliant member configured to enable a selected magnitude of displacement of the at least one bearing element of the first structure in a first direction relative to the first structure; and
a second compliant member positioned between the first structure and the at least one bearing element of the first structure, the second compliant member configured to enable a selected magnitude of displacement of the at least one bearing element of the first structure in a second direction relative to the first structure, the second direction being different from the first direction.

2. The bearing apparatus of claim 1, wherein at least one of the first compliant member and the second compliant member is configured to allow for a selected magnitude of variation of a surface of the at least one bearing element of the first structure between about ±2°.

3. The bearing apparatus of claim 1, wherein at least one of the first compliant and the second compliant member comprises a biasing element.

4. The bearing apparatus of claim 3, wherein the biasing element comprises a wave spring washer, a curved spring washer, or a Belleville spring washer.

5. The bearing apparatus of claim 3, wherein the biasing element is configured to bias the at least one selected bearing element in at least one of the following directions: a radial direction, a circumferential direction, and a longitudinal direction.

6. The bearing apparatus of claim 1, wherein at least one of the first compliant member and the second compliant member comprises a material having a modulus of elasticity of between about 5,000 ksi and about 30,000 ksi.

7. The bearing apparatus of claim 1, wherein the first compliant member is configured to bias the at least one bearing of the first structure in at least one of a radial direction, a circumferential direction, and a longitudinal direction, and wherein the second compliant member is configured to bias the at least one bearing of the first structure in at least one other direction of the radial direction, the circumferential direction and the longitudinal direction.

8. The bearing apparatus of claim 1, further comprising at least one other compliant member disposed between the at least one bearing element of the second structure, the at least one other compliant member configured to enable a selected magnitude of displacement of the at least one bearing member of the second structure relative to the first structure.

9. The bearing apparatus of claim 1, wherein each of the first plurality of bearing elements and each of the second plurality of bearing elements comprise polycrystalline diamond.

10. The bearing apparatus of claim 1, wherein:
the first structure includes a substantially ring-shaped body and wherein the second structure includes a substantially ring-shaped body;
the first structure includes a plurality of recesses configured to mount the first plurality of bearing elements; and
the second structure includes a plurality of recesses configured to mount the second plurality of bearing elements.

11. The bearing apparatus of claim 1, wherein the first surface is substantially planar and the second surface is substantially planar.

12. The bearing apparatus of claim 1, wherein the first bearing surface is substantially ring-shaped and the second bearing surface is substantially ring-shaped.

13. The bearing apparatus of claim 1, wherein the first structure and the second structure are configured to collectively form a radial bearing apparatus.

14. A component for use in a bearing apparatus comprising:
a body;
a plurality of bearing elements mounted to the body, the plurality of bearing elements each comprising a polycrystalline diamond table formed on a substrate;
a plurality of compliant members positioned between the plurality of bearing elements and the body, each of the plurality of compliant members comprising a circumferential side wall and a substantially flat closed end defining a substantially cylindrical recess, each compliant member being configured to enable a selected magnitude of displacement of an associated bearing element of the plurality of bearing elements in a first direction relative to the body
and in a second direction relative to the body.

15. The component of claim 14, wherein the body is substantially ring-shaped and includes a plurality of recesses configured to mount the plurality of bearing elements.

16. The component of claim 14, wherein each of the plurality of bearing elements comprises a superhard material bonded to a substrate.

17. The component of claim 14, wherein each of the plurality of bearing elements comprises a polycrystalline diamond table formed on a cemented tungsten carbide substrate.

18. The component of claim 14, wherein each of the first plurality of compliant members comprises a biasing element.

19. The component of claim 14, wherein the sidewall of each of the plurality of compliant members includes a plurality of openings formed therein.

20. The component of claim 14, wherein each of the plurality of compliant members is configured to bias its respective bearing element of the plurality of bearing elements in at least one of the following directions: a radial direction and a longitudinal direction.

21. A bearing apparatus comprising:
a first structure having at least one bearing element defining a first bearing surface, the at least one bearing element of the first structure comprising a polycrystalline diamond table formed on a substrate;
a second structure having at least one bearing element defining a second bearing surface, the first bearing surface and the second bearing surface configured to engage one another during relative displacement of the first structure and the second structure; and
a compliant member positioned between the first structure and the at least one bearing element of the first structure, wherein the compliant member comprises a circumferential wall portion and a substantially flat closed end portion defining a substantially cylindrical recess for receipt of a portion of the at least one bearing element of the first structure, the compliant member configured to enable a selected magnitude of displacement of the at least one bearing element of the first structure in a first direction relative to the first structure and a selected magnitude of displacement of the at least one bearing element of the first structure in a second direction relative to the first structure, the second direction being different from the first direction.

22. A motor assembly for use in drilling subterranean formations, the motor assembly comprising:
a motor configured to apply a torque to a rotary drill bit, the motor operably coupled to a thrust bearing apparatus;
wherein the thrust bearing apparatus comprises:
a first structure having a plurality of bearing elements defining a first bearing surface, at least one bearing element of the plurality of bearing elements of the first structure comprising a polycrystalline diamond table formed on a substrate;
a second structure having a plurality of bearing elements defining a second bearing surface, the first bearing surface and the second bearing surface configured to engage one another during relative displacement of the first structure and the second structure;
a first compliant member positioned between the first structure and the at least one bearing element of the first structure, the first compliant member configured to enable a selected magnitude of displacement of the at least one bearing element of the first structure in a first direction relative to the first structure; and
a second compliant member positioned between the first structure and the at least one bearing element of the first structure, the second compliant member configured to enable a selected magnitude of displacement of the at least one bearing element of the first structure in a second direction relative to the first structure, the second direction being different from the first direction.

* * * * *